(12) United States Patent
Wright (10) Patent No.: US 9,324,122 B2
(45) Date of Patent: Apr. 26, 2016

(54) VOTING SCHEME FOR TIME ALIGNMENT (71) Applicant: Schweitzer Engineering Laboratories, Inc., Pullman, WA (US)

(72) Inventor: Aaron E Wright, Pullman, WA (US)

(73) Assignee: SCHWEITZER ENGINEERING LABORATORIES, INC., Pullman, WA (US)

( * ) Notice: Subject to any disclaimer, the term of this patent is extended or adjusted under 35 U.S.C. 154(b) by 859 days.

(21) Appl. No.: 13/656,532

(22) Filed: Oct. 19, 2012

(65) Prior Publication Data

US 2014/0114731 A1    Apr. 24, 2014

(51) Int. Cl.
*G01R 31/02*    (2006.01)
*G06Q 99/00*    (2006.01)
*H04L 9/32*    (2006.01)

(52) U.S. Cl.
CPC .............. *G06Q 99/00* (2013.01); *H04L 9/3297* (2013.01); *G06Q 2230/00* (2013.04); *H04L 2209/46* (2013.01)

(58) Field of Classification Search
CPC ................................ G06Q 99/00; H02H 3/00
USPC ........................................ 702/58, 62; 705/12
See application file for complete search history.

(56) References Cited

U.S. PATENT DOCUMENTS

| | | | |
|---|---|---|---|
| 4,535,306 A | 8/1985 | Yamaguchi | |
| 4,546,486 A | 10/1985 | Evans | |
| 4,808,884 A | 2/1989 | Hull | |
| 5,103,466 A | 4/1992 | Bazes | |
| 5,235,590 A | 8/1993 | Taguchi | |
| 5,644,576 A | 7/1997 | Bauchot | |
| 5,790,605 A * | 8/1998 | Helm | H04B 7/02 375/347 |
| 5,793,869 A | 8/1998 | Claflin | |
| 6,456,831 B1 | 9/2002 | Tada | |
| 6,496,862 B1 | 12/2002 | Akatsu | |
| 6,662,124 B2 | 12/2003 | Schweitzer | |
| 6,678,134 B2 | 1/2004 | Sugiura | |
| 6,754,210 B1 | 6/2004 | Ofek | |
| 6,845,333 B2 | 1/2005 | Anderson | |
| 6,859,742 B2 | 2/2005 | Randall | |
| 6,891,441 B2 | 5/2005 | Rochow | |
| 6,937,683 B1 | 8/2005 | Ratzel | |
| 6,944,555 B2 | 9/2005 | Blackett | |
| 7,272,201 B2 | 9/2007 | Whitehead | |
| 7,583,771 B2 | 9/2009 | Zweigle | |
| 8,655,608 B2 * | 2/2014 | Guzman-Casillas | G01R 31/088 324/522 |
| 2001/0023464 A1 | 9/2001 | Deck | |

(Continued)

FOREIGN PATENT DOCUMENTS

| | | |
|---|---|---|
| EP | 1290529 | 3/2003 |
| GB | 2278519 | 11/1994 |

(Continued)

*Primary Examiner* — Lam Nguyen
(74) *Attorney, Agent, or Firm* — Stoel Rives LLP; Richard M. Edge (57) ABSTRACT

Systems and methods for time aligning time-stamped measurements using a voting scheme are disclosed. The system and method filter incoming measurements based on whether the time-stamped measurements fall within a defined time window. In response to determining that the time stamp falls within the defined time window, the time-stamped measurement is added to a time slice corresponding with the time stamp. In response to determining that the time-stamped measurement does not fall within the defined time window, the time window is re-established based on a voting scheme.

23 Claims, 7 Drawing Sheets

(56) References Cited

U.S. PATENT DOCUMENTS

2004/0240470 A1   12/2004  Medved
2005/0122950 A1    6/2005  Ikeda
2007/0266004 A1   11/2007  Wall
2008/0071482 A1*   3/2008  Zweigle ............. G01R 19/2513
                                                           702/62

FOREIGN PATENT DOCUMENTS

| JP | 10247377 | 9/1998 |
| WO | 99/00951 | 7/1999 |
| WO | 00/11840 | 3/2000 |
| WO | 00/16525 | 3/2000 |
| WO | 00/57527 | 9/2000 |

* cited by examiner

VOTING SCHEME FOR TIME ALIGNMENT

TECHNICAL FIELD

This disclosure relates to time aligning time-stamped measurements in an electric power transmission or distribution system. Particularly, this disclosure relates to time aligning time-stamped measurements using a voting scheme based filter.

BRIEF DESCRIPTION OF THE DRAWINGS

Non-limiting and non-exhaustive embodiments of the disclosure are described, including various embodiments of the disclosure with reference to the figures, in which.

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Electric power transmission and distribution systems may utilize precision time information to perform various monitoring, protection, and communication tasks. In connection with certain applications, intelligent electronic devices (IEDs) and network communication devices may utilize time information accurate beyond the millisecond range. IEDs within a power system may be configured to perform metering, control, and protection functions that require a certain level of precision between one or more IEDs. For example, IEDs may be configured to calculate and communicate time-synchronized phasors (synchrophasors), which may require that the IEDs and network devices be synchronized to within nanoseconds of one other.

Phasor data measurements may allow for the comparison of phasor data values from a variety of distinct components that may be geographically isolated from each other. Phasor data measurements may be time aligned and concentrated to produce time-aligned data sets (i.e., synchrophasors) that may be used for real-time decision making as well as post-event analysis. Many protection, metering, control, and automation algorithms used in power systems may benefit from time aligned synchrophasor measurements.

Generally, when concentrating phasor data measurements, the measurements come from a variety of different measurement sources. In some situations (e.g., geographically isolated measurement sources), these sources can each have their own independent time source. Additionally, the communication path from each source to the device doing the concentrating can vary in reliability, latency, bandwidth, etc. These factors may lead to unreliability in the measurements arriving at the concentrator. For example, measurements may arrive with time stamps that are invalid, much later than when they were supposed to, not at all, or multiple times. Therefore, a method of time aligning the various inputs that takes into account the less than reliable nature receiving measurements is needed.

Reference throughout this specification to "one embodiment" or "an embodiment" indicates that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, an "embodiment" may be a system, an article of manufacture (such as a computer readable storage medium), a method, or a product of a process.

The phrases "connected to," "networked," and "in communication with" refer to any form of interaction between two or more entities, including mechanical, electrical, magnetic, and electromagnetic interaction. Two components may be connected to each other even though they are not in direct physical contact with each other and even though there may be intermediary devices between the two components.

Some of the infrastructure that can be used with embodiments disclosed herein is already available, such as: general-purpose computers, computer programming tools and techniques, digital storage media, and optical networks. A computer may include a processor such as a microprocessor, microcontroller, logic circuitry, or the like. The processor may include a special purpose processing device such as an ASIC, PAL, PLA, PLD, Field Programmable Gate Array, or other customized or programmable device. The computer may also include a computer readable storage device such as non-volatile memory, static RAM, dynamic RAM, ROM, CD-ROM, disk, tape, magnetic, optical, flash memory, or other computer readable storage medium.

As used herein, the term IED may refer to any microprocessor-based device that monitors, controls, automates, and/or protects monitored equipment within the system. Such devices may include, for example, digital fault recorders, phase measurement units (PMUs), phase measurement and control units (PMCUs), phasor data concentrators (PDCs), Supervisory Control and Data Acquisition (SCADA) systems, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term IED may be used interchangeably to describe an individual IED or a system comprising multiple IEDs.

IEDs, network devices, and time distribution devices may be physically distinct devices, may be composite devices, or may be configured in a variety of ways to perform overlapping functions. IEDs, network devices, and time distribution devices may comprise multi-function hardware (e.g., processors, computer-readable storage media, communications interfaces, etc.) that can be utilized in order to perform a variety of tasks, including tasks typically associated with an IED, network device, and/or time distribution device. For example, a network device, such as a multiplexer, may also be configured to issue control instructions to a piece of monitored equipment. In another example, an IED may be configured to function as a firewall. The IED may use a network interface, a processor, and appropriate software instructions stored in a computer-readable storage medium in order to simultaneously function as a firewall and as an IED. In another example, an IED may include the necessary hardware and software instructions to function as both a PMU and a PDC. In order to simplify the discussion, several embodiments disclosed herein are illustrated in connection with PMUs and PDCs; however, one of skill in the art will recognize that the teachings of the present disclosure, including those teachings illustrated only in connection with PMUs and PDCs, are also applicable to other IEDs and network devices capable of performing similar functions.

Aspects of certain embodiments described herein may be implemented as software modules or components. As used herein, a software module or component may include any type of computer instruction or computer executable code located within a computer readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer readable storage medium, which together implement the described functionality of the module. Indeed, a module may comprise a single instruction or many instructions, and may be distributed over several different code segments, among different programs, and across several computer readable storage media. Some embodiments may be practiced in a distributed computing environment where tasks are performed by a remote processing device linked through a communications network. In a distributed computing environment, software modules may be located in local and/or remote computer readable storage media. In addition, data being tied or rendered together in a database record may be resident in the same computer readable storage medium, or across several computer readable storage media, and may be linked together in fields of a record in a database across a network.

The software modules described herein tangibly embody a program, functions, and/or instructions that are executable by computer(s) to perform tasks as described herein. Suitable software, as applicable, may be readily provided by those of skill in the pertinent art(s) using the teachings presented herein and programming languages and tools, such as XML, Java, Pascal, C++, C, database languages, APIs, SDKs, assembly, firmware, microcode, and/or other languages and tools.

Furthermore, the described features, operations, or characteristics may be combined in any suitable manner in one or more embodiments. It will also be readily understood that the order of the steps or actions of the methods described in connection with the embodiments disclosed herein may be changed, as would be apparent to those skilled in the art. Thus, any order in the drawings or detailed description is for illustrative purposes only and is not meant to imply a required order, unless specified to require an order.

Figure 1:
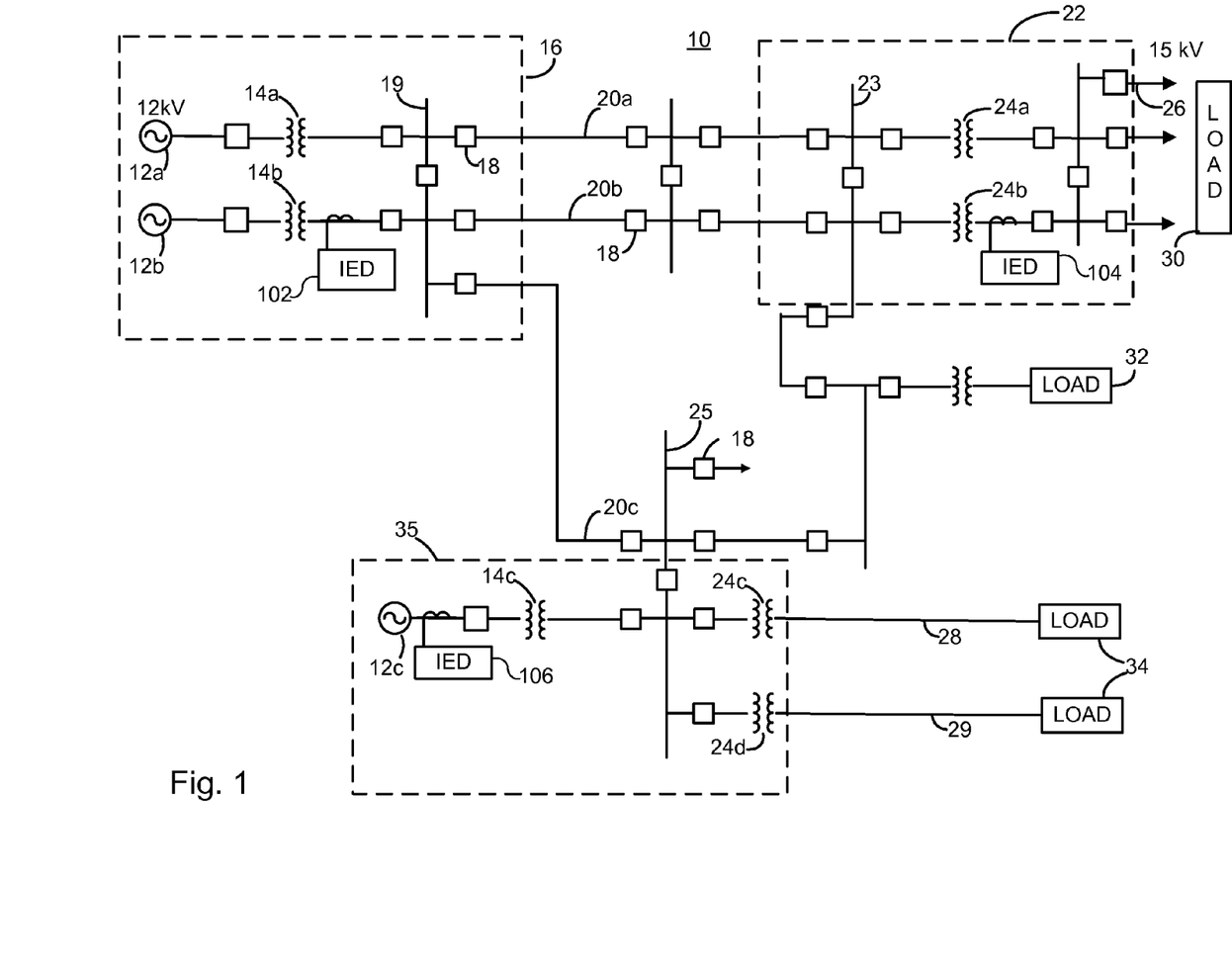
FIG. 1 is a diagram of an electric power distribution system.

FIG. 1 illustrates a diagram of an electric power distribution system 10. The distribution system 10 includes intelligent electronic devices (IEDs) 102, 104, and 106 that may provide measurements utilizing a precision time reference to monitor, protect, and/or control system components. The electric power transmission and distribution system 10 illustrated in FIG. 1 includes three geographically separated substations 16, 22, and 35. Substations 16 and 35 include generators 12a, 12b, and 12c. The generators 12a, 12b, and 12c generate electric power at a relatively low voltage, such as 12 kV. The substations include step-up transformers 14a, 14b, and 14c to step up the voltage to a level appropriate for transmission. The substations include various breakers 18 and buses 19, 23, and 25 for proper transmission and distribution of the electric power. The electric power may be transmitted over long distances using various transmission lines 20a, 20b, and 20c.

Substations 22 and 35 include step-down transformers 24a, 24b, 24c, and 24d for stepping down the electric power to a level suitable for distribution to various loads 30, 32, and 34 using distribution lines 26, 28, and 29.

IEDs 102, 104, and 106 are illustrated in substations 16, 22, and 35 configured to protect, control, meter and/or automate certain power system equipment or devices. According to several embodiments, numerous IEDs are used in each substation; however, for clarity only a single IED at each substation is illustrated. IEDs 102, 104, and 106 may be configured to perform various time dependent tasks including, but not limited to, monitoring and/or protecting a transmission line, distribution line, and/or a generator. Other IEDs included in a substation may be configured as PMUs, PDCs, bus protection relays, distance relays, communications processors, automation controllers, transformer protection relays, and the like. As each IED or group of IEDs may be configured to communicate on a local area network (LAN) or wide area network (WAN), each IED or group of IEDs may be considered a node in a communications network.

As discussed above, an IED may be configured to calculate and communicate synchrophasors with other IEDs. To accurately compare synchrophasors obtained by geographically separate IEDs, each IED may need to be synchronized with a precision time reference with accuracy greater than a millisecond to allow for time-aligned comparisons. According to various embodiments, time synchronization, accurate to the microsecond or nanosecond range, may allow IEDs to perform accurate comparisons of synchrophasors.

Figure 2:
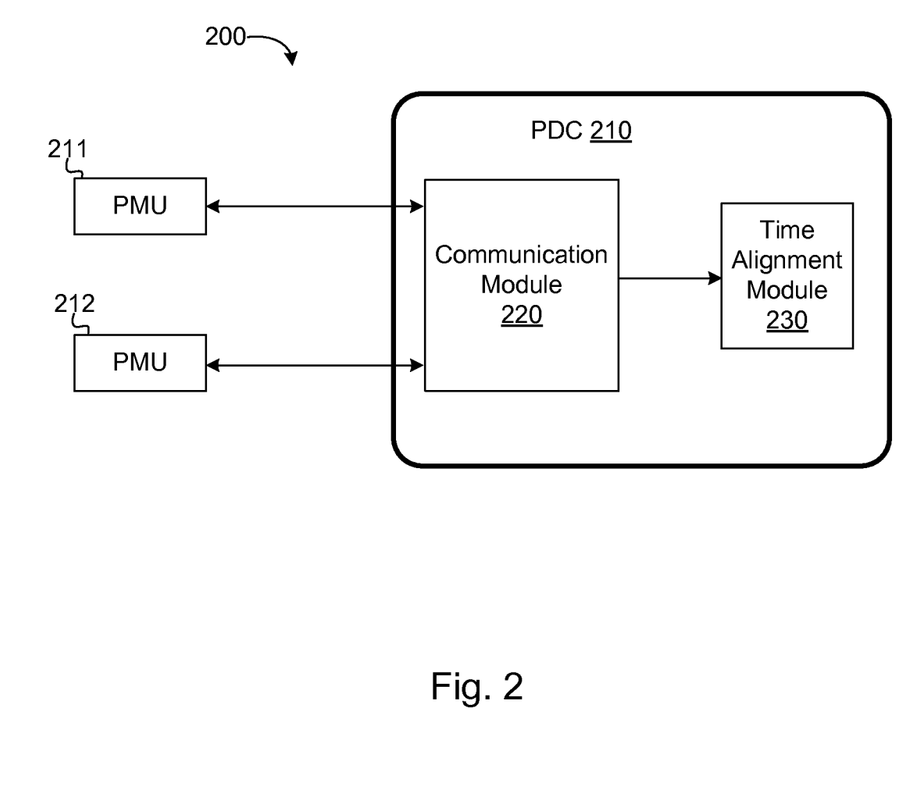
FIG. 2 illustrates a block diagram of a system including a phasor data concentrator.

FIG. 2 illustrates a block diagram of a system including a phasor data concentrator according to techniques introduced here.

System 200 may comprise a PDC 210 in communication with PMUs 211 and 212. PMU 211 may be communicatively coupled to a first power system segment (not shown) to measure a current flowing between a first power system node (not shown) and a transformer (not shown). PMU 212 may be communicatively coupled to a second segment of the power system (not shown) to measure a current flowing between the transformer (not shown) and a second node (not shown).

PDC 210 may communicate with PMUs 211 and 212 via communication module 220 which may be configured to receive measurements including phase-current measurements from the PMUs 211 and 212. The measurements representing electrical conditions and status indicators may be formatted as a plurality of data streams in the IEEE C37.118 format. In an alternative embodiment, PDC 210 may be directly coupled to first power system segment (not shown) and/or second power system segment (not shown) via a first and second current transformer (not shown). In this embodiment, PDC 210 may be configured to obtain phase-current measurements directly from the first and second power system segments (not shown).

Communication module 220 may be configured to communicate with PMU 211 and 212 using the IEEE C37.118 communication standard. The IEEE C37.118 standard may be used to communicate synchronized phasor measurement data. The IEEE C37.118 standard is not media dependent and, as such, may be used on EIA-232 and/or an Ethernet communications connection. One skilled in the art, however, would recognize that PMUs 211 and 212, and PDC 210 could be configured to use any communications standard and/or protocol known in the art such as, for example, SEL Fast Message, MirroredBits® communication, GOOSE, IEC 61850, MODBUS, and the like. As such, this disclosure should not be read as limited to any particular communications standard and/or protocol.

The measurements received by communication module 220 from PMU 211 and 212 may flow to time alignment module 230. The phase-current measurement data received from PMU 211 and 212 may comprise time stamp or other measurement timing information. As such, time alignment module 230 may time align the measurement data relative to one another. Time alignment is discussed in more detail below with reference to FIG. 3. In addition, in some embodiments, time alignment module 230 may comprise a buffer or other memory to time align incoming messages from PMUs 211 and 212.

PDC 210 may be directly coupled to the first and second power system segment (not shown). In this case, PDC 210 may be configured to time align phase-current measurements obtained from one or more current transformers (not shown) using time alignment module 230.

Figure 3A:
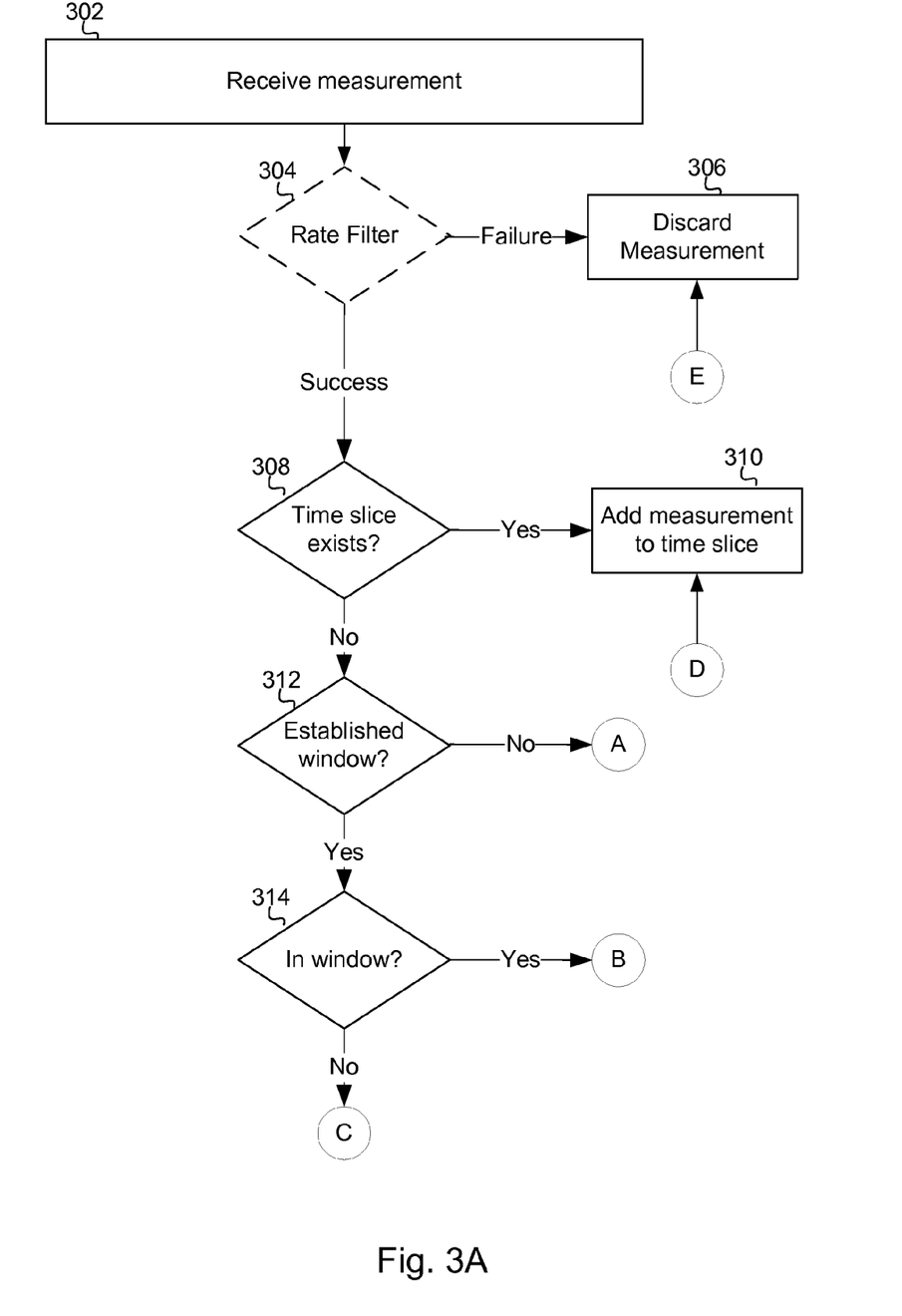
FIGS. 3A, 3B, and 3C illustrate one embodiment for time aligning time-stamped measurements.

FIG. 3 illustrates one embodiment for time aligning time-stamped measurements. The process begins on FIG. 3A at 302 where the PDC 210 receives a time-stamped phasor-data measurement from a PMU 211 or 212. At 304, the PDC 210 may optionally filter the received time-stamped measurement based on the measurement rate at the PMU. This optional filter may be useful in time aligning time-stamped measurements if the various PMUs are taking measurements at different rates. In one embodiment, a user of the PDC 210 may set the desired rate for the filter. In another embodiment, the PDC 210 may automatically determine a rate for the filter based on the rate of received time-stamped measurements and/or a reported measurement rate. At 304, if a received measurement is not in synch with the desired or expected rate (i.e., the filter determines a failure) the received measurement is discarded at 306. If, however, the received measurement is in synch with the desired or expected rate (i.e., the filter determines a success) the process continues to 308 where the PDC 210 determines whether a time slice that corresponds with the time stamp of the received measurement exists.

At 308, if the PDC 210 determines that a time slice corresponds with the time stamp of the received measurement, the PDC 210 adds the measurement to the time slice at 310. A time slice, as used herein, is a collection of measurements that have the same time stamp. In some embodiments, the PDC 210 includes a time stamp conditioner that may round or otherwise modify time stamps of received measurements such that the time stamps have a consistent format and are more easily concentrated into a time slice. However, if at 308, a time slice that corresponds with the time stamp of the received measurement does not exist, the process continues to 312 where the PDC 210 determines whether a window for acceptable time stamps has been established.

If no window has been established, the process continues to 316 (FIG. 3B) where the window is established. In one embodiment, a user may define a waiting period, which in turn may determine the size of the window. The window may be defined as one waiting period prior to the currently accepted time and one waiting period after the current time. Thus, a time stamp that falls within one waiting period of the currently accepted time would be within the window. At 318 the PDC 210 creates a time slice corresponding to the time stamp of the time-stamped measurement and the process returns to 310 where the PDC 210 adds the measurement to the newly created time slice.

Figure 3B:
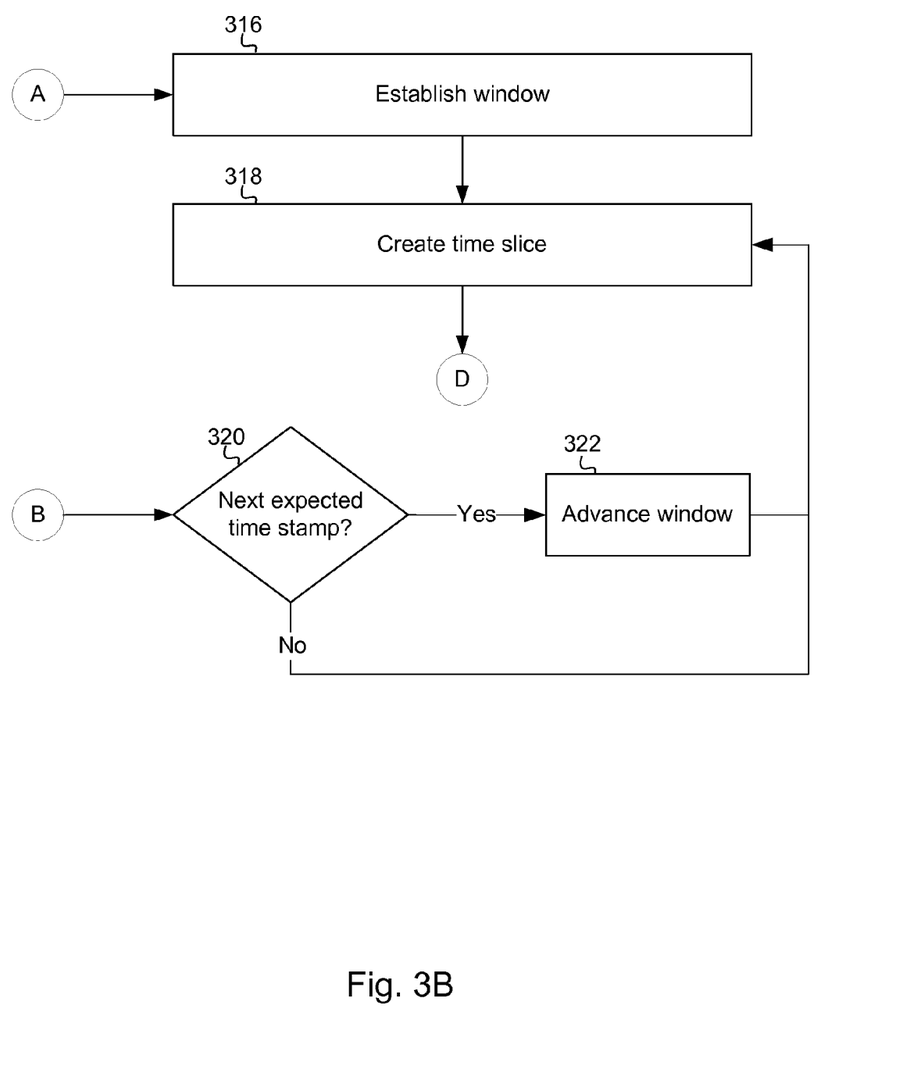
Figure 3C:
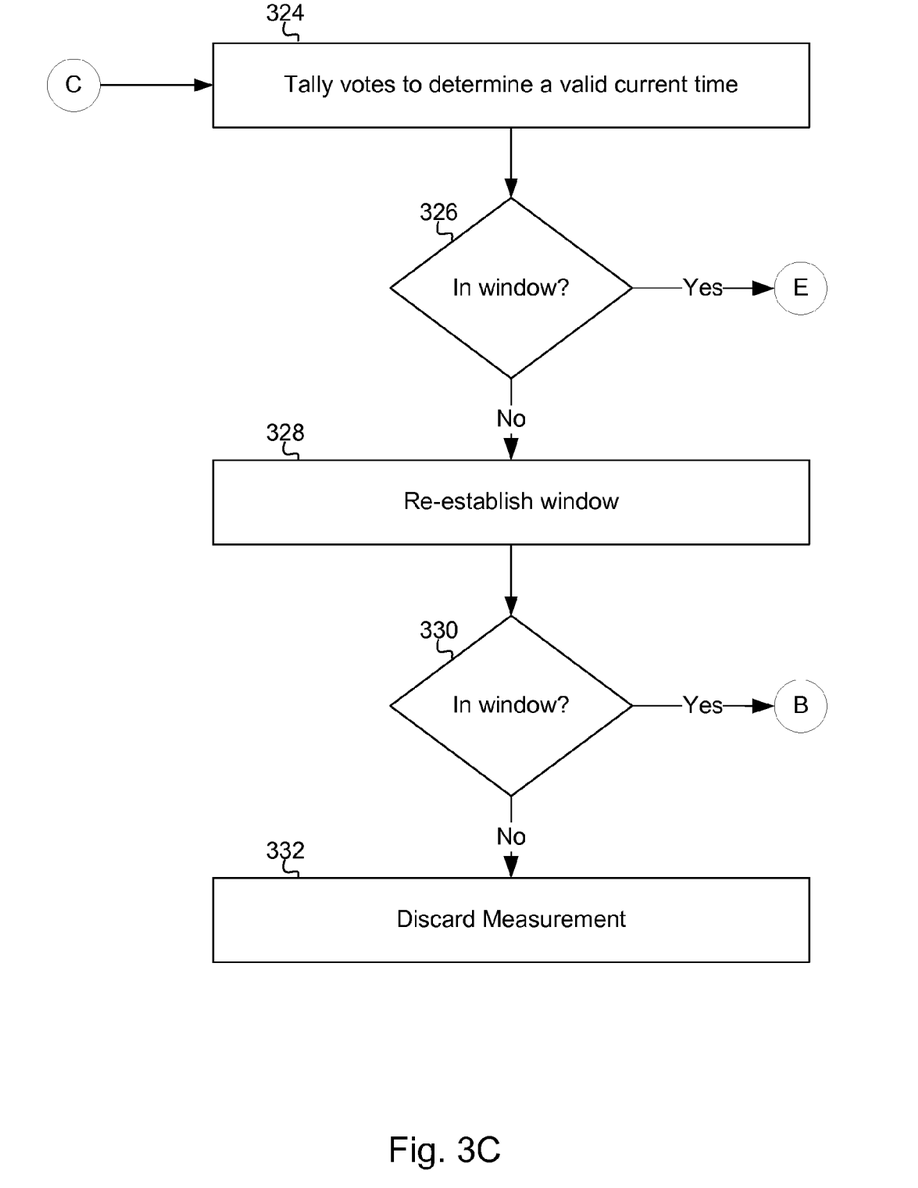

If, at 312, the PDC 210 determines that a window has been established, the process continues to 314 where the PDC 210 determines whether the time stamp of the received measurement falls within the established window. At 320, the PDC 210 further determines whether the time stamp of the received measurement is the next expected time stamp. The PDC 210 is able to determine whether the time stamp of the received measurement is the next expected time stamp based on previously received measurements and a set rate of measurement. If the PDC 210 determines that the time stamp is the next expected time stamp, the PDC 210 advances the window at 322, creates a new time slice at 318, and adds the received measurement to the newly created time slice at 310. In one embodiment, the PDC 210 advances the window by the time difference between time stamps and therefore the threshold for filtering out older, less reliable time stamps is continuously updated leading to more reliable synchrophasor data.

Returning to 320, in one embodiment if the PDC 210 determines that the time stamp of the received measurement is not the next expected time stamp, the window is not advanced and the PDC 210 creates a new time slice at 318, and adds the received measurement to the newly created time slice at 310.

Returning to 314, if the PDC 210 determines that the time stamp of the received measurement does not fall within the window, the process continues to 324 (FIG. 3C) where the PDC 210 initiates a voting scheme by tallying votes to determine a valid current time. The process for tallying votes is described in more detail below with reference to FIG. 4. After having determined a valid current time, the PDC 210 determines, at 326, whether the valid current time is within the current window. If the PDC 210 determines that the valid current time is within the current window, at 306 the PDC 210 discards the received measurement as not falling within the current window and therefore invalid data. If the PDC 210 determines that the valid current time is not within the current window, at 328 the PDC 210 re-establishes the window based on the valid current time determined at 324 and the waiting period defined by the user. After having re-established the window based on the valid current time, the PDC, at 330, determines whether the received measurement that triggered the re-establishment of the window falls within the re-established window. If the PDC 210 determines that the received measurement falls within the re-established window, the process returns to 320. If the PDC 210 determines that the received measurement does not fall within the re-established window, the PDC discards the measurement at 332.

Figure 4:
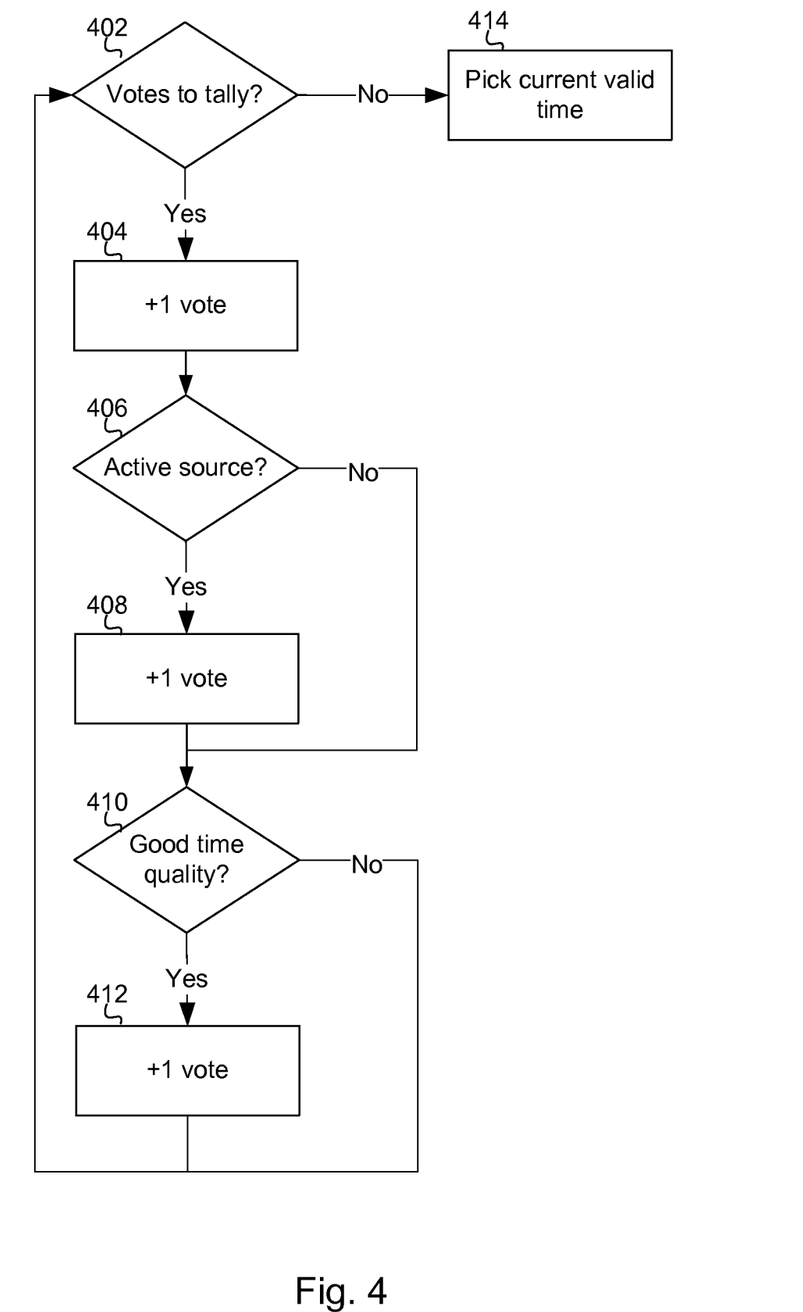
FIG. 4 illustrates one embodiment of a voting scheme used in time aligning time-stamped measurements.

FIG. 4 illustrates one embodiment of a voting scheme used in time aligning time-stamped measurements. The voting scheme, as discussed above, may be used to determine a current valid time when a time-stamped measurement includes a time stamp that does not fall within a currently established window of acceptable time stamps. The process begins at 402 where the PDC 210 determines whether there are remaining votes to tally. In one embodiment, the PDC 210 maintains a data structure to store the most recent measurement received from each measurement source (e.g., PMU 211 and 212). The PDC 210 may step through the data structure and repeat the process until each of the currently stored measurements have been counted.

If at 402 the PDC 210 determines that the data structure contains measurements that have not yet been counted, the process continues to 404 where the time stamp corresponding to the measurement receives one vote. This assures that each valid measurement stored in the data structure receives a vote on what the current valid time should be. If, at 406, the measurement source is considered an active source, the measurement receives an additional vote. If a measurement source has not sent a measurement for several measurement cycles (i.e., the source is not active), the time stamp stored in the data structure for that measurement source is not likely going to represent the current time and therefore the measurement will not receive a vote and time stamp associated with the measurement receives less weight.

If at 410 the PDC 210 determines that the time stamp associated with the measurement stored in the data structure is considered to be of good quality the time stamp receives one vote. In one embodiment, each measurement received by the PDC 210 includes an associated quality attribute that describes the source of the time stamp associated with the measurement. The source of the time stamp may be a time signal received using an Inter-Range Instrumentation Group (IRIG) protocol, a global navigation satellite system (GNSS, such as, for example, global positioning system (GPS), GLONASS, or the like), a radio broadcast such as a National Institute of Science and Technology (NIST) broadcast (e.g., radio stations WWV, WWVB, and WWVH), the IEEE 1588 protocol, a network time protocol (NTP) codified in RFC 1305, a simple network time protocol (SNTP) in RFC 2030, a local oscillator, and/or another time transmission protocol or system. In some embodiments, the user may define a desired threshold precision and the sources with a precision above that threshold qualify as a source with good time quality.

Returning to 402, if the PDC 210 has considered all of the measurements stored in the data structure, the process continues to 414 where the PDC 210 picks the time stamp that received the most votes as the current valid time. The PDC 210 maintains a record of the votes received for each time stamp during the voting process and tallies the votes to determine the current valid time. The situation may arise where there are multiple time stamps that tie for the highest number of votes. In this situation, a tie breaking protocol is employed to determine the current valid time. In one embodiment, the median time stamp of the tied times stamps may be declared the current valid time. In the event that there is not a median time stamp (i.e., there is an even number of time stamps tied for the most votes), the greater of the two median times may be declared the current valid time.

Figure 5:
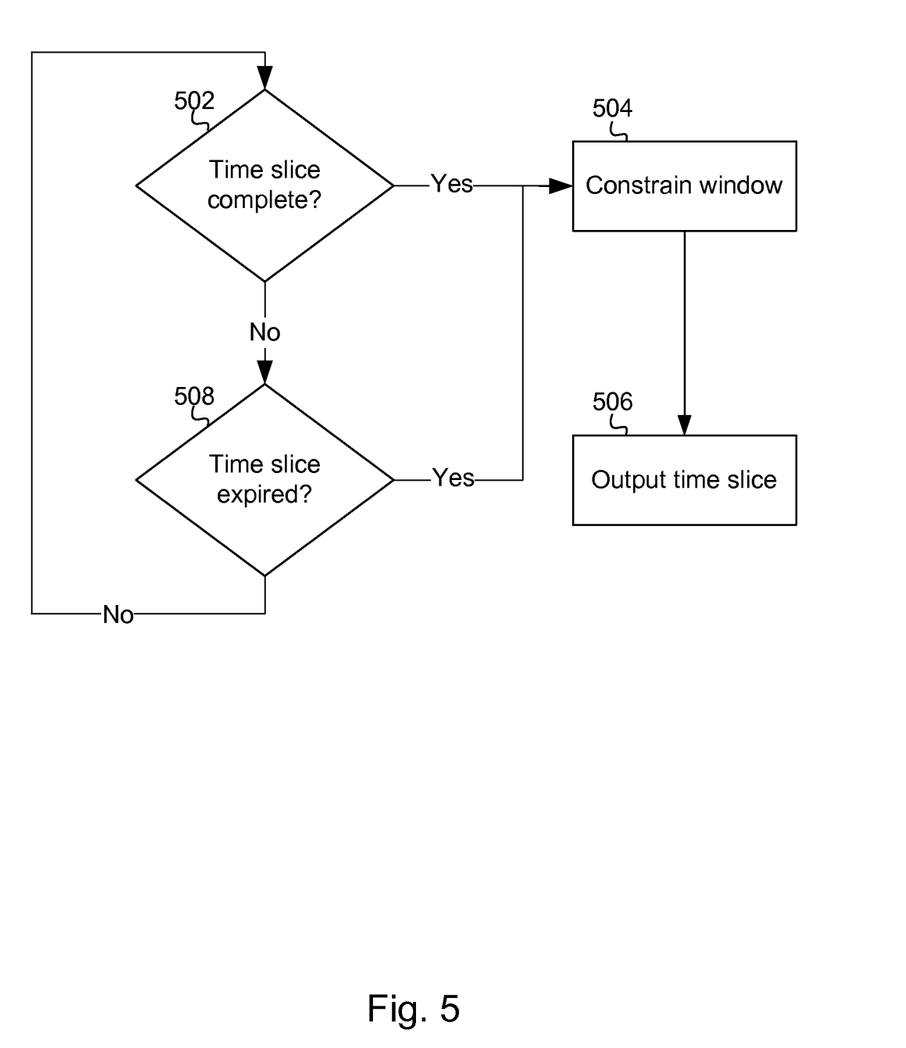
FIG. 5 illustrates one embodiment for outputting time aligned measurements.

As introduced above, the time aligned and concentrated measurements may be used in power systems by protection, metering, control, and automation algorithms. FIG. 5 illustrates one embodiment for outputting time aligned measurements to other components of the power system. The process begins at 502 where the PDC 210 determines whether a time slice is complete. In one embodiment, the PDC 210 may consider the time slice complete when a measurement from each measurement source has been recorded in the time slice. If, at 502, the PDC 210 determines that the time slice is complete, the process continues to 504 where the PDC 210 constrains the window based on the completed time slice. In one embodiment, the PDC 210 constrains the window by setting the oldest acceptable time stamp to the time stamp that follows the time stamp of the completed time slice. This modifies the window used for filtering incoming measurements and allows only measurements that are newer than those in the completed time slice. The process continues to 506 where the PDC 210 outputs the completed time slice to consuming components in the power system.

If, at 502, the PDC 210 determines that the time slice is not complete, the process continues to 508 where the PDC 210 determines whether the time slice has expired. In one embodiment, the PDC 210 determines whether the time slice has expired based on the waiting period set by the user. If the PDC 210 determines that the time slice has not expired, the process returns to 502 where the process begins anew. If, however, the PDC 210 determines that the time slice has expired, the PDC 210 constrains the window at 504 and outputs the time slice at 506. In some embodiments, the expired time slice is not complete but may still be of use to consuming components of the power distribution system. In some embodiments, a longer waiting period will enable the time slice to remain un-expired for a longer time and may result in more data being received. A shorter waiting period may cause the time slice to expire early prior to receiving a measurement from each measurement source. The length of the waiting period is therefore dependent on the user's application of the concentrated data and may therefore be left up to the user.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A method comprising:
   receiving a time-stamped measurement at a phasor data concentrator;
   determining that the time-stamped measurement does not fall within a defined time window; and
   in response to determining that the time-stamped measurement does not fall within the defined time window:
   re-establishing the defined time window based on a voting scheme;
   determining that the time-stamped measurement falls within the re-established defined time window; and
   adding the time-stamped measurement to a new time slice corresponding to a time stamp associated with the time-stamped measurement.

2. The method of claim 1, further comprising:
   establishing the defined time window based on user input.

3. The method of claim 1, further comprising:
   determining that the time-stamped measurement includes the next expected time stamp and advancing the re-established defined time window.

4. The method of claim 1, wherein re-establishing the defined time window comprises:
   tallying votes to determine a valid current time from a plurality of time stamps, wherein each measurement source provides a respective time stamp of the plurality of time stamps; and re-establishing the defined time window based on the valid current time and user input.

5. The method of claim 4, wherein each respective time stamp receives one vote for contributing a time stamp, one vote for a determination that the measurement source is an active source, and one vote for a determination that the measurement source provides a time stamp with good time quality.

6. The method of claim 1, further comprising:
determining that a time slice is complete;
outputting the complete time slice; and
constraining the time window based on the outputted time slice.

7. The method of claim 1, further comprising:
determining that a time slice has expired;
outputting the expired time slice; and
constraining the time window based on the outputted time slice.

8. A method comprising:
receiving a time-stamped measurement at a phasor data concentrator;
determining that a time slice does not exist for the time-stamped measurement;
determining that the time-stamped measurement falls within a defined time window; and
in response to determining that the time-stamped measurement falls within the defined time window, adding the time-stamped measurement to a new time slice corresponding to a time stamp associated with the time-stamped measurement.

9. The method of claim 8, further comprising:
establishing the defined time window based on user input.

10. The method of claim 8, further comprising:
determining that the time-stamped measurement includes the next expected time stamp and advancing the defined time window.

11. The method of claim 8, further comprising:
in response to determining that the time stamped measurement does not fall within the defined time window, re-establishing the defined time window based on a voting scheme.

12. The method of claim 11, wherein re-establishing the defined time window comprises:
tallying votes to determine a valid current time from a plurality of time stamps, wherein each measurement source provides a respective time stamp of the plurality of time stamps; and
re-establishing the time window based on the valid current time and user input.

13. The method of claim 12, wherein each respective time stamp receives one vote for contributing a time stamp, one vote for a determination that the measurement source is an active source, and one vote for a determination that the measurement source provides a time stamp with good time quality.

14. The method of claim 8, further comprising:
determining that a time slice is complete;
outputting the complete time slice; and
constraining the time window based on the outputted time slice.

15. The method of claim 8, further comprising:
determining that a time slice has expired;
outputting the expired time slice; and
constraining the time window based on the outputted time slice.

16. A phasor data concentrator comprising:
an input configured to receive a time-stamped measurement;
a time alignment module configured to:
determine that a time slice does not exist for the time-stamped measurement;
determine that the time-stamped measurement falls within a defined time window and create a new time slice corresponding to a time stamp associated with the time-stamped measurement and add the time-stamped measurement to the new time slice;
finalize a time slice; and
an output configured to output the finalized time slice.

17. The phasor data concentrator of claim 16, wherein the time alignment module, in response to determining that the time-stamped measurement does not fall within the defined time window, is further configured to re-establish the defined time window based on a voting scheme.

18. The phasor data concentrator of claim 16, wherein the time alignment module is configured to establish the defined time window based on user input.

19. The phasor data concentrator of claim 16, wherein the time alignment module is further configured to:
determine whether the time-stamped measurement includes the next expected time stamp; and
in response to determining that the time-stamped measurement includes the next expected time stamp, advance the defined time window.

20. The phasor data concentrator of claim 16, wherein the time alignment module is configured to:
tally votes to determine a valid current time from a plurality of time stamps, wherein each measurement source provides a respective time stamp of the plurality of time stamps; and
re-establish the time window based on the valid current time and user input.

21. The phasor data concentrator of claim 20, wherein each respective time stamp receives one vote for contributing a time stamp, one vote for a determination the measurement source is an active source, and one vote for a determination the measurement source provides a time stamp with good time quality.

22. The phasor data concentrator of claim 16, wherein the time alignment module, to finalize a time slice, is configured to:
determine whether a time slice is complete; and
constrain the time window based on the complete time slice.

23. The phasor data concentrator of claim 16, wherein the time alignment module, to finalize a time slice, is configured to:
determine whether a time slice is expired; and
constrain the time window based on the expired time slice.

* * * * *